United States Patent
House et al.

(10) Patent No.: US 9,068,473 B2
(45) Date of Patent: Jun. 30, 2015

(54) SPRING CLIP METHOD FOR ANTI-ROTATION AND THRUST CONSTRAINT OF A ROLLING ELEMENT BEARING CARTRIDGE

(75) Inventors: Timothy House, Hendersonville, NC (US); Paul Diemer, Arden, NC (US); Allan Kelly, Hendersonville, NC (US); Augustine Cavagnaro, Flat Rock, NC (US)

(73) Assignee: BorgWarner Inc., Auburn Hills, MI (US)

( * ) Notice: Subject to any disclaimer, the term of this patent is extended or adjusted under 35 U.S.C. 154(b) by 720 days.

(21) Appl. No.: 13/318,652

(22) PCT Filed: Apr. 30, 2010

(86) PCT No.: PCT/US2010/033116
§ 371 (c)(1),
(2), (4) Date: Nov. 3, 2011

(87) PCT Pub. No.: WO2010/129407
PCT Pub. Date: Nov. 11, 2010

(65) Prior Publication Data
US 2012/0051906 A1    Mar. 1, 2012

Related U.S. Application Data

(60) Provisional application No. 61/176,155, filed on May 7, 2009.

(51) Int. Cl.
*F01D 25/16* (2006.01)
*F16C 27/04* (2006.01)
(Continued)

(52) U.S. Cl.
CPC .............. *F01D 25/16* (2013.01); *F16B 21/183* (2013.01); *F16C 19/184* (2013.01); *F16C 27/04* (2013.01); *F16C 33/58* (2013.01); *F16C 35/077* (2013.01);
(Continued)

(58) Field of Classification Search
CPC .. F04D 29/0462; F04D 29/0563; F01D 25/16
USPC ................... 415/229; 384/524, 445, 903, 535
See application file for complete search history.

(56) References Cited

U.S. PATENT DOCUMENTS 4,281,601 A * 8/1981 Overman ...................... 102/276
4,425,520 A * 1/1984 Hiraga ...................... 192/84.961
(Continued)

FOREIGN PATENT DOCUMENTS

CN        1201105        12/1998
CN        101069023      11/2007
(Continued)

*Primary Examiner* — Nathaniel Wiehe
*Assistant Examiner* — Michael Sehn
(74) *Attorney, Agent, or Firm* — Miller Canfield

(57) ABSTRACT

To solve both axial and rotational constraint problems in turbochargers with rolling element bearings (REBs), a REB cartridge is mounted to the bearing housing in a way that is not rigid, thus allowing for an oil damping film. At the same time, the REB cartridge is held both axially and rotationally, so that the outer race does not rotate relative to the bearing housing. This dual purpose is achieved using a special dual-mode spring clip with at least one anti-rotation feature for engaging the bearing housing and at least one anti-rotation feature for engaging the REB cartridge, thereby axially locating the REB cartridge and preventing rotation of the outer race.

11 Claims, 14 Drawing Sheets

(51) Int. Cl.
*F16C 19/18* (2006.01)
*F16C 33/58* (2006.01)
*F16C 35/077* (2006.01)
*F16C 41/00* (2006.01)
*F16B 21/18* (2006.01)

(52) U.S. Cl.
CPC .............. *F16C 41/00* (2013.01); *F16C 27/045* (2013.01); *F05D 2220/40* (2013.01); *F16C 2360/24* (2013.01); *F16C 2226/74* (2013.01)

(56) References Cited

U.S. PATENT DOCUMENTS

| | | | |
|---|---|---|---|
| 4,708,602 A * | 11/1987 | McEachern et al. | 417/407 |
| 4,997,290 A | 3/1991 | Aida | |
| 5,059,844 A * | 10/1991 | Anstine | 310/90 |
| 5,145,334 A * | 9/1992 | Gutknecht | 417/407 |
| 5,947,265 A * | 9/1999 | Merten et al. | 198/834 |
| 5,961,281 A * | 10/1999 | Ojima et al. | 415/173.6 |
| 6,126,414 A | 10/2000 | Koike | |
| 2003/0072509 A1 | 4/2003 | Woollenweber | |
| 2003/0142891 A1* | 7/2003 | Iwamoto et al. | 384/448 |
| 2007/0110351 A1 | 5/2007 | Larue | |
| 2008/0019629 A1* | 1/2008 | McKeirnan | 384/493 |
| 2009/0081040 A1 | 3/2009 | Ueno et al. | |

FOREIGN PATENT DOCUMENTS

| | | |
|---|---|---|
| JP | 2002039191 | 2/2002 |
| JP | 2005163641 | 6/2005 |

* cited by examiner

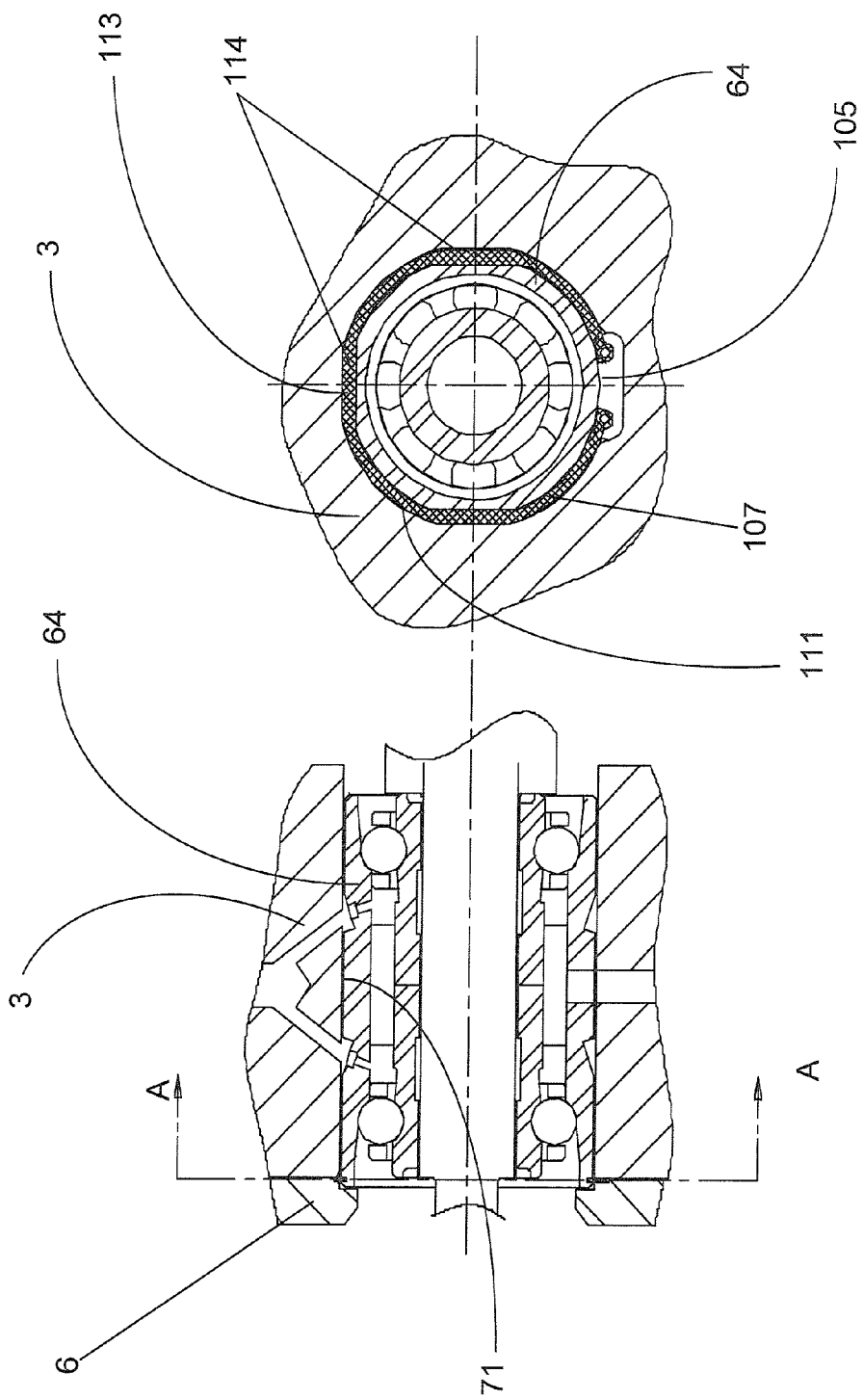

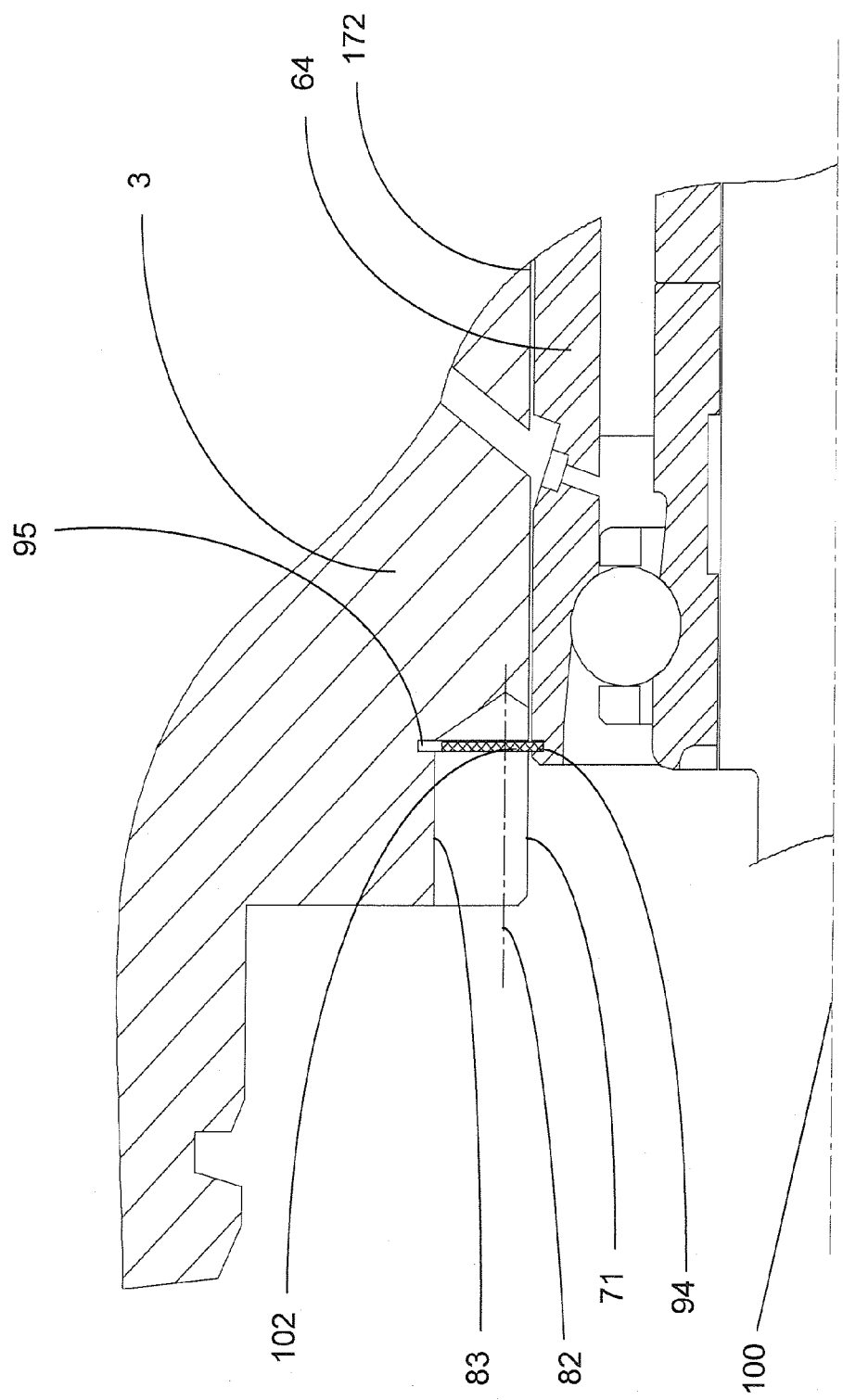

SPRING CLIP METHOD FOR ANTI-ROTATION AND THRUST CONSTRAINT OF A ROLLING ELEMENT BEARING CARTRIDGE

FIELD OF THE INVENTION

This invention is directed to a system for constraint of a turbocharger rolling element bearing cartridge, and more particularly, to a system that, with simple machining and low cost parts, ensures correct assembly and provides anti-rotation as well as constraint against thrust loads in either axial direction. The invention provides a simple system for mounting the rolling element bearing (REB) cartridge with sufficient play to allow for damping by an encapsulating oil film or an oil flow under pressure, but, at the same time, allowing the REB cartridge to be held axially, to transfer the axial loads to the bearing housing, and rotationally, so that the REB cartridge does not rotate relative to the bearing housing.

BACKGROUND OF THE INVENTION

Turbochargers deliver air, at greater density than would be possible in the normally aspirated configuration, to the engine intake, allowing more fuel to be combusted, thus boosting the engine's horsepower without significantly increasing engine weight. This can enable the use of a smaller turbocharged engine, replacing a normally aspirated engine of a larger physical size, thus reducing the mass and aerodynamic frontal area of the vehicle.

Turbochargers are a type of forced induction system which use the exhaust flow entering the turbine housing from the engine exhaust manifold to drive a turbine wheel (51), which is located in the turbine housing. The turbine wheel is solidly affixed to a shaft to become the shaft and wheel assembly. A compressor wheel (20) is mounted to the stub shaft (56) end of the shaft and wheel and held in position by the clamp load from a compressor nut (29). The primary function of the turbine wheel is extracting rotational power from the exhaust gas to drive the compressor.

The compressor stage consists of a wheel (20) and its housing. Filtered air is drawn axially into the inlet of the compressor cover by the rotation of the compressor wheel. The power input by the turbine stage to the shaft and wheel drives the compressor wheel to produce a combination of static pressure with some residual kinetic energy and heat. The pressurized gas exits the compressor cover through the compressor discharge and is delivered, usually via an intercooler, to the engine intake.

In one aspect of compressor stage performance, the efficiency of the compressor stage is influenced by the clearances between the compressor wheel contour (28) and the matching contour in the compressor cover. The closer the compressor wheel contour is to the compressor cover contour, the higher the efficiency of the stage. In a typical compressor stage with a 76 mm compressor wheel, the tip clearance is in the regime of from 0.31 mm to 0.38 mm. The closer the wheel is to the cover, the higher the chance of a compressor wheel rub; so, there must exist a compromise between improving efficiency and improving durability.

To the naked eye, the nose of the compressor wheel in a typical turbocharger appears to rotate about the geometric longitudinal axis of the bearing housing; however, when viewed as a track on an X,Y oscilloscope, the nose of the compressor wheel describes orbits of various shapes. The average centroid of the orbits is close to, but not exactly centered on, the geometric longitudinal axis of the turbocharger. The geometric axis (100) is shown in FIG. 1, of the turbocharger.

The dynamic excursions taken by the shaft and wheels are attributed to a number of factors including: the unbalance of the rotating assembly; the excitation of the pedestal (ie the engine and exhaust manifold); and the low speed excitation from the vehicle's interface with the ground.

The net effect of these excursions taken by the shaft and wheels is that the design of the typical turbocharger has clearances far greater than those desired for aerodynamic efficiency levels.

The typical turbocharger is fed with oil from the engine. This oil, at a pressure typically equal to that of the engine, performs several functions. The oil is delivered to both sides of the journal bearings to provide a double hydrodynamic squeeze film, the pressures of which exert reactionary forces of the shaft on the inner diameter of the bearing and of the outer diameter of the bearing on the bearing housing bore. The oil films provide attenuation of the reactionary forces to reduce the amplitude of the excursions of the shaft. The oil also functions to remove heat from the turbocharger.

A typical turbocharger design has two adjacent bearing systems: one at the compressor-end of the bearing housing; and one at the turbine-end of the bearing housing. Each system has two interfaces: the interface of the rotating shaft on the I.D. of the floating bearing, and the interface of the O.D. of the floating bearing on the fixed bore of the bearing housing.

The stiffness and damping capacities of the typical turbocharger double hydrodynamic squeeze film bearings are a compromise between the thickness of the film generated by the rotational speed of the bearing elements, the clearance between said elements, and the oil flow limitations due to the propensity of turbochargers to pass oil through the piston ring seals at either end of the shaft.

The use of REB bearings in a turbocharger solves several problems, including: high oil flow rates, bearing damping, and power losses through the bearing system.

FIG. 1 depicts a typical turbocharger double hydrodynamic squeeze film bearing configuration. In this configuration, pressurized oil is received to the bearing housing (3) though an oil inlet (80) from the engine. The oil is pressure-fed through the oil galleries (82 and 83) to the bearing housing journal bearing bore (4). For both the turbine-end and compressor-end bearings (30), the oil flow is delivered to the shaft and wheel journal bearing zones where the oil is distributed around the shaft to generate an oil film between the shaft surface (52) and the inner bore of the floating journal bearings (30). On the outside of the journal bearings (30), a like oil film is generated by the rotation of the journal bearing against the bearing housing journal bearing bore (4). Once through the journal and thrust bearings the oil exits the bearing housing via the oil drain (85) at the base of the bearing housing and is returned to the crankcase of the engine.

In the typical turbocharger depicted in FIG. 1, the thrust bearing (19) is also a hydrodynamic or fluid film type of bearing. In this configuration, the stationary thrust bearing is fed oil from the oil gallery (81) to feed a ramp and pad design of the bearing. The oil is driven into a wedge shape by the relative motion of the thrust washer (40) and the opposing face of the flinger (44), which is mounted to the shaft, against the static thrust ramp and pad. This bearing controls the axial position of the rotating assembly.

One method for increasing the efficiency of the turbocharger has been the adoption of rolling element bearings (REBs) to support the rotating assembly. Rolling element bearings can be divided into two general types. The first type uses a pair of typical REB assemblies. Each REB assembly, in this case, consists of an outer race, the balls or roller elements, an inner race, a cage, and seals. This pair of REB assemblies can be pressed or shrunk into a sleeve, i.e., an outer cylindrical housing with oil galleries and locations for the REB assemblies, to produce the REB cartridge. In the second type, the sleeve is omitted, and the outer race of the REB assembly defines the outer diameter of the REB cartridge. Unless otherwise indicated, the term "REB" used herein will refer to the REB cartridge.

As seen in FIG. 2 REBs typically have an inner race (65), which is mounted to the shaft and wheel journal surface (52). Assembled to the inner race, or races (65, 65C and 65T) are a set of rolling elements connecting the inner race to the outer race (64) (FIG. 6A). The outer race is mounted within the bore (71) in the bearing housing (3). Since rolling element bearings do not require as much oil as do typical turbocharger journal bearings, an oil restrictor (86) is fitted to the oil inlet (80) to restrict the flow of oil to the REBs.

There are several improvements that come with the adoption of rolling element bearing turbochargers. There is an improvement in transient response due to the reduction in power losses, especially at low turbocharger RPM, of the REB system over the typical turbocharger bearing system. The power losses in REB systems are less than those for typical sleeve-type turbocharger bearing systems. REB systems can support much greater thrust loads than can typical turbocharger bearing systems making the thrust component more robust. Since typical ramp and pad thrust bearings require a large percentage of the oil flow delivered to the turbocharger, and REB systems require less oil flow (than a typical turbocharger bearing system), then less oil flow is required for a REB system with the positive consequence that there is less propensity for oil passage to the compressor or turbine stages where that oil can poison the catalyst.

Although ball bearing systems provide these efficiency and transient performance gains, the damping capacity of ball bearings is not as good as that of the typical turbocharger double hydrodynamic squeeze film bearings. For ease of assembly, the ball bearings are retained in a steel REB cartridge, which is suspended within the bearing housing by an oil film between the O.D. of the cartridge and the I.D. of the bearing housing bore. The oil is used for damping of shaft critical events and for lubrication of the bearings. With this design it is critical that the bearing cartridge is not in a metal-to-metal contact with the bearing housing bore as the damping function will be lost.

U.S. Pat. No. 5,145,334 (Gutknecht) and U.S. Pat. No. 7,214,037 (Mavrosakis) teach methods for the retention of a floating bearing cartridge in a bearing housing. A post secured in the bearing housing (e.g., restrictor 86) restrains the bearing cartridge such that the post reacts against the axial and rotational forces, while allowing for otherwise unconstrained motion (float) of the bearing cartridge in the bearing housing. In U.S. Pat. No. 7,214,037, as shown in FIG. 4, a pin (460) received by an opening (444) of the housing (440) optionally aids in locating the cartridge azimuthally, with respect to the housing (440). A pin (72) similar to that of U.S. Pat. No. 5,145,334 is shown in FIG. 3 of the present application, locating a bore (68) in the cartridge and a bore (70) in the outer race to provide both axial and rotational constraint relative to the bearing housing. Both of these methods require machining through orifices in the bearing housing, and, furthermore, they require intricate assembly in an area not well-visible to the assembler, making both correct assembly and verification of the assembly of said pins difficult.

U.S. Pat. No. 7,214,037 teaches the use of a counter-bore (442, FIG. 4) and a plate (450) to control the axial loads exerted on the outer race of the bearing cartridge. The machining of this counter-bore requires accurate placement of the cutting tool, which must change direction from cutting a diametral surface to an abutment surface deep inside the bearing housing, without leaving too great an inclusive corner radius which might not allow the bearing cartridge to seat on the abutment. The execution of this process adds cost and complexity to the machining of the bearing housing.

So it can be seen that the current state of axial and rotational constraint of the REB cartridge is both costly and complex. A more cost and technically effective solution is needed.

SUMMARY OF THE INVENTION

The present inventors considered that there existed a need to solve the above problems of mounting the REB cartridge in a manner which allowed for damping by an encapsulating oil film, but, at the same time, allowing the REB cartridge to be held axially, to transfer the axial loads to the bearing housing, and rotationally, so that the REB cartridge does not rotate relative to the bearing housing. There is thus a need for a cost-effective, simple to assemble, anti-rotation feature to allow a damping oil film around the REB cartridge yet prevent the REB assembly from rotating relative to the bearing housing.

The inventors solved the problems by developing a dual-mode snap ring that provides a simple, assembly-foolproof, low cost, easy to machine, anti-rotation feature, allow a damping oil film flow around the REB cartridge if needed, yet preventing the bearing cartridge of a rolling element bearing assembly from rotating relative to the bearing housing.

BRIEF DESCRIPTION OF THE DRAWINGS

The present invention is illustrated by way of example and not by limitation in the accompanying drawings in which like reference numbers indicate similar parts and in which:

FIGS. 12A, 12B depict magnified sections of the second variation of the first embodiment of the invention;

FIG. 14 depicts a magnified section of the second embodiment of the invention.

DETAILED DESCRIPTION OF THE INVENTION

Although there are problems associated with the conventional methods for constraint of a ball bearing cartridge against rotation relative to the bearing housing in which it mounts, the omission of axial and radial constraint would allow the wheels to contact the housings and would allow the cartridge to spin in the bearing housing, each of which would shorten the life of the turbocharger.

The invention provides a dual-mode snap ring and a constraining system using the dual-mode snap ring. Although snap rings conventionally have generally circular radially inner surfaces and generally circular radially outer surfaces, the dual-mode snap rings of the present invention include
   at least one non-round radially inner surface for engaging in a complementary non-round surface of the REB cartridge, preferably formed in a groove,
   at least one non-round radially outer surface for engaging in a complementary non-round surface of the bearing housing, the radially inner and outer engagements producing an anti-rotation constraint of the REB cartridge, and
   first and second axial surfaces, adapted for being seated radially outwardly in a groove in the bearing housing or defined between the bearing housing and bearing housing closure plate and radially inwardly in a groove in the REB cartridge, and preventing axial movement of the REB cartridge in the compressor direction as well as in the turbine direction.

This dual-mode snap ring and the REB cartridge constraining system fulfills the needs for constraint of the REB cartridge in both axial and rotational directions and the need for the assembly task to be easily mastered by the assembly personnel, as well as the need to easily visually verify that the constraining device was actually and correctly installed in the completed turbocharger assembly. The dual-mode snap ring provides a simple, assembly-foolproof, low cost, easy to machine anti-rotation feature to allow a damping oil film flow around the REB cartridge yet prevent the bearing cartridge of a rolling element bearing assembly from rotating relative to the bearing housing.

Figure 1:
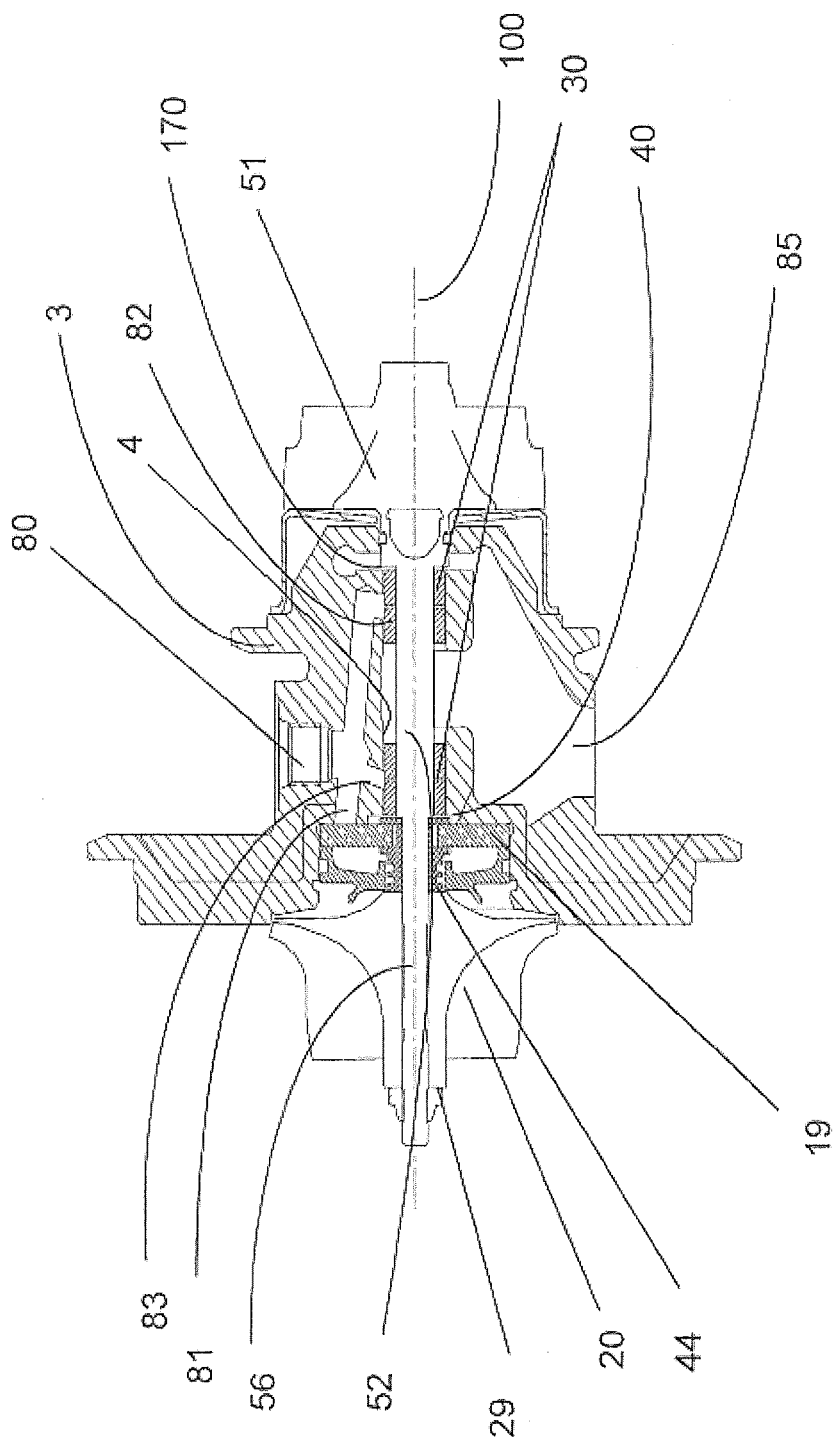
FIG. 1 depicts a section of a turbocharger assembly.
Figure 2:
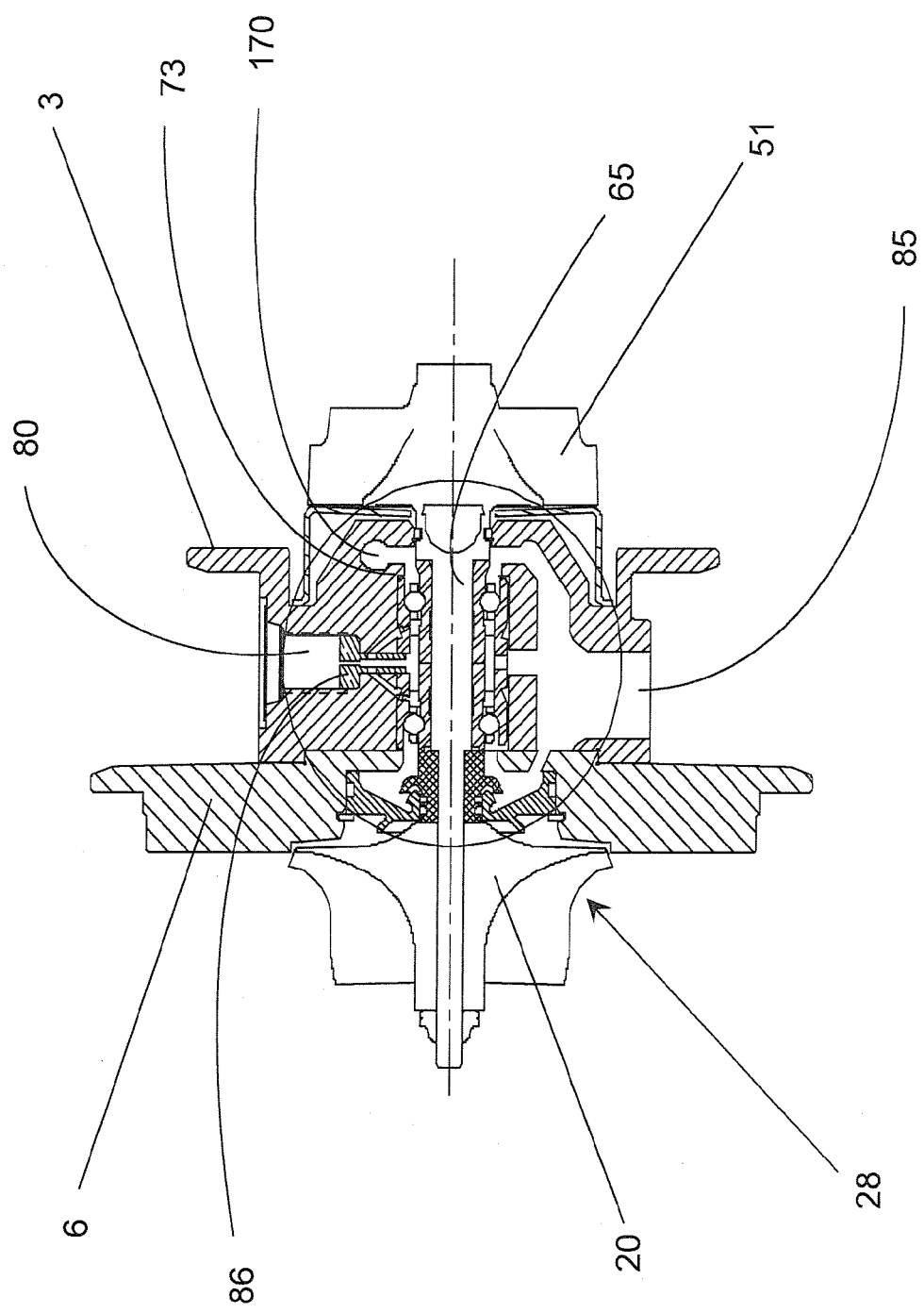
FIG. 2 depicts a section of a typical ball bearing turbocharger bearing housing assembly.
Figure 3:
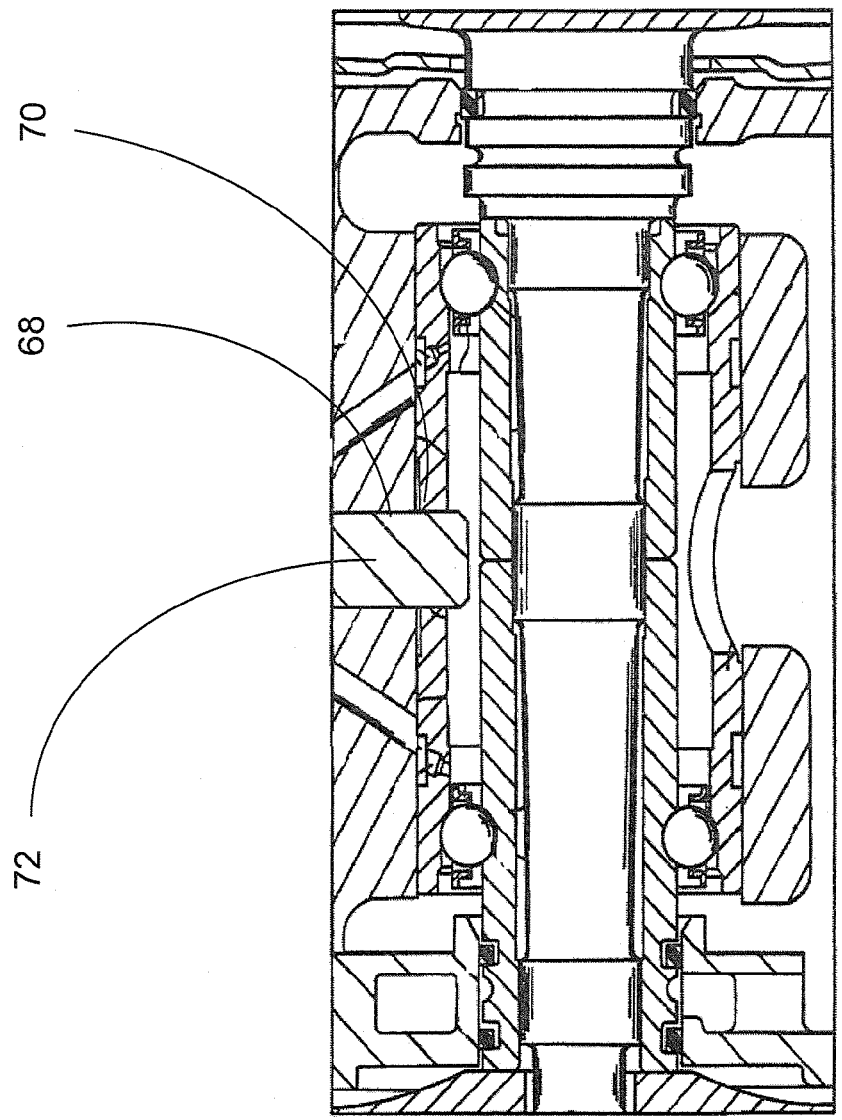
FIG. 3 depicts a prior art roller bearing.
Figure 4:
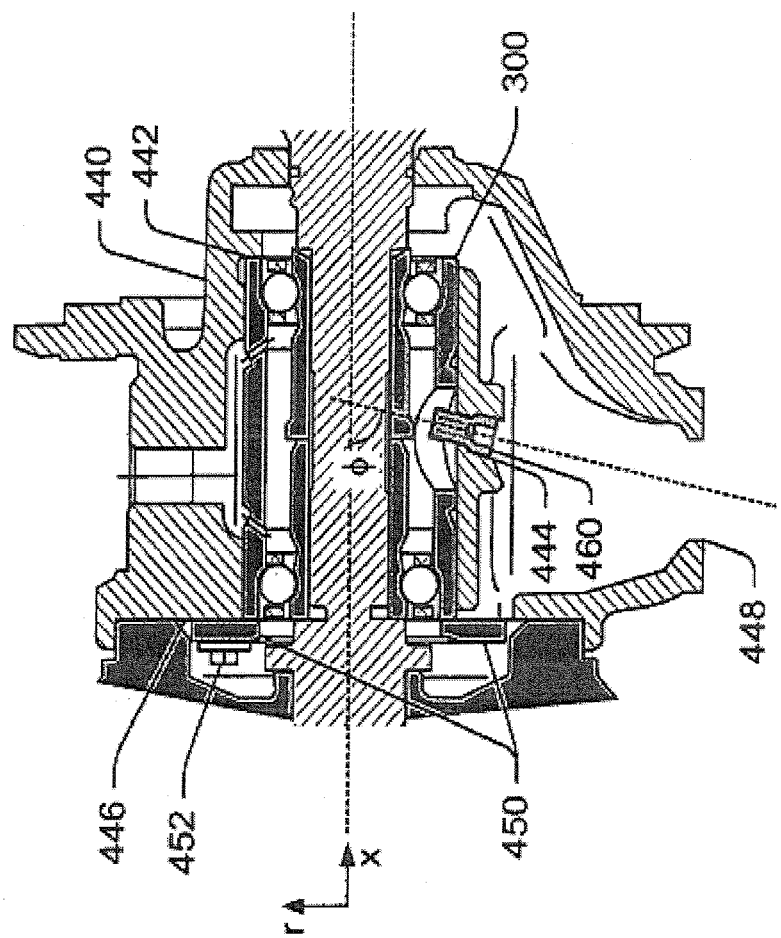
FIG. 4 depicts another prior art roller bearing.

In accordance with the invention, the turbine-end axial abutment (73), shown in FIG. 2, which was a feature of conventional restraining, is no longer required, allowing the bearing housing bore (71) to be machined with constant diameter where it opens out into the oil flinger cavity (170). While this may seem only a slight modification, it is in fact a substantial improvement in manufacturability. Elimination of the turbine-end axial abutment (73) allows the bearing housing bore to be honed to improve the surface finish whereas, with an abutment present, the process of honing a cylindrical surface in a blind hole is quite difficult.

A first embodiment of the dual-mode snap ring (102), as shown in FIGS. 8A and 8B, has a radially inside surface (112) and a radially outside surface (111). In addition to the features of a conventional snap ring, the dual-mode snap ring (102) has one or more non-round, e.g., flat sections or shapes generally providing rotational constraint (107), fabricated into the generally round or circular inside surface (112) of the ring such that, with the dual-mode snap ring in the relaxed state, the flat sections (107) in the dual-mode snap ring fit to corresponding flat inner sections (106) of grooves (94), fabricated into the REB cartridge, or outer race.

On the radially outer surface (111) the dual-mode snap ring (102) of the first embodiment has a male tab (104), projecting radially outward, which fits into a reverse imaged scallop (103) in the bearing housing to prevent rotation of the snap ring with respect to the bearing housing. This rotationally arresting arrangement of dual-mode snap ring to bearing housing, and rotationally arresting arrangement of REB cartridge to dual-mode snap ring, thus constrains the REB cartridge from rotating relative to the bearing housing. The rotationally arresting feature could also be a pin (in the bearing housing) and a corresponding hole (in the dual-mode snap ring) depending upon manufacturing techniques.

The dual-mode snap ring (102) also has two, usually flat, axial or "cheek" faces. The bearing housing radially has a recess adapted to receive the snap ring, and the REB cartridge radially has a groove adapted to receive the snap ring, such that with axial thrust from the REB cartridge in the direction of the turbine, the snap ring turbine-side cheek face (109) bears on the turbine side of the recess (67) in the bearing housing (3), and with axial thrust in the direction of the compressor the compressor-side cheek face (108) of the dual-mode snap ring bears on the turbine-side face (168) of the bearing housing closure (6).

The dual-mode snap ring (102) can be variously designed, so long as it provides, in conjunction with the bearing housing, both axial and rotational constraint of the REB cartridge in the bearing housing.

While in the first exemplary embodiment of the invention, the rotational constraint of the REB cartridge to the dual-mode snap ring takes the form of three flat surfaces in the snap ring interlocking with three flat surfaces in the REB cartridge, there could be any number greater than one flat surface, interlocking with the same number of flat surfaces in the REB cartridge to both provide the rotational constraint and a unique angular alignment so that any oil channel machined into the bearing housing communicates with a corresponding oil channel machined into the outer race.

While in the first exemplary embodiment of the invention the rotational constraint of the REB cartridge to the dual-mode snap ring takes the form of three linear or flat surfaces in the snap ring interlocking with three flat surfaces in the REB cartridge there could be other rotationally constraining geometries, such as curves or tabs in either the dual-mode snap ring or the REB cartridge which perform the same function. The rotationally arresting constraint between the dual-mode snap ring and the REB cartridge could also be a pin and groove/hole/keyway which aligns the REB cartridge to the dual-mode snap ring.

Figure 5:
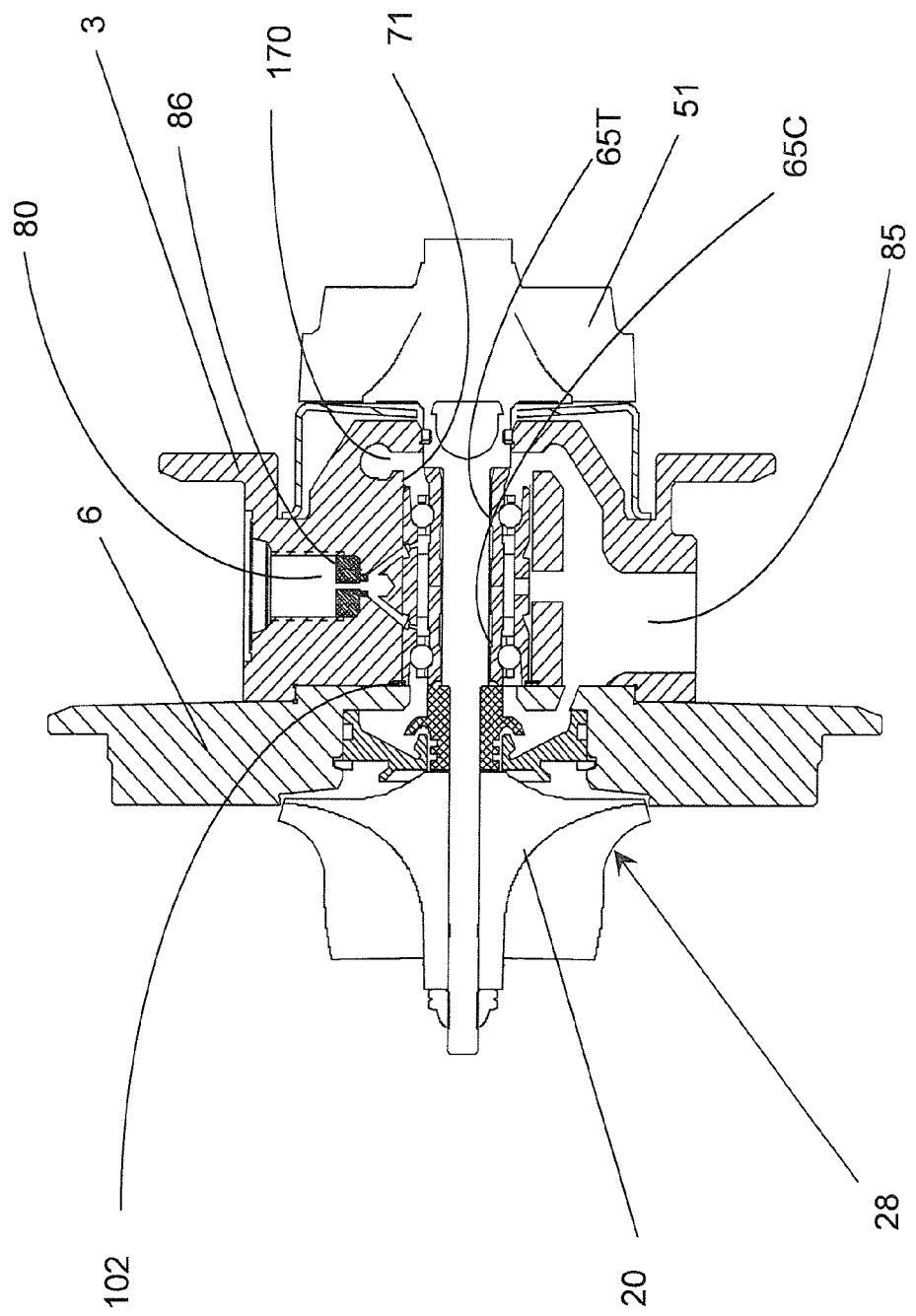
FIG. 5 depicts a view of a sectioned bearing housing assembly with a first embodiment of the invention.
Figure 6:
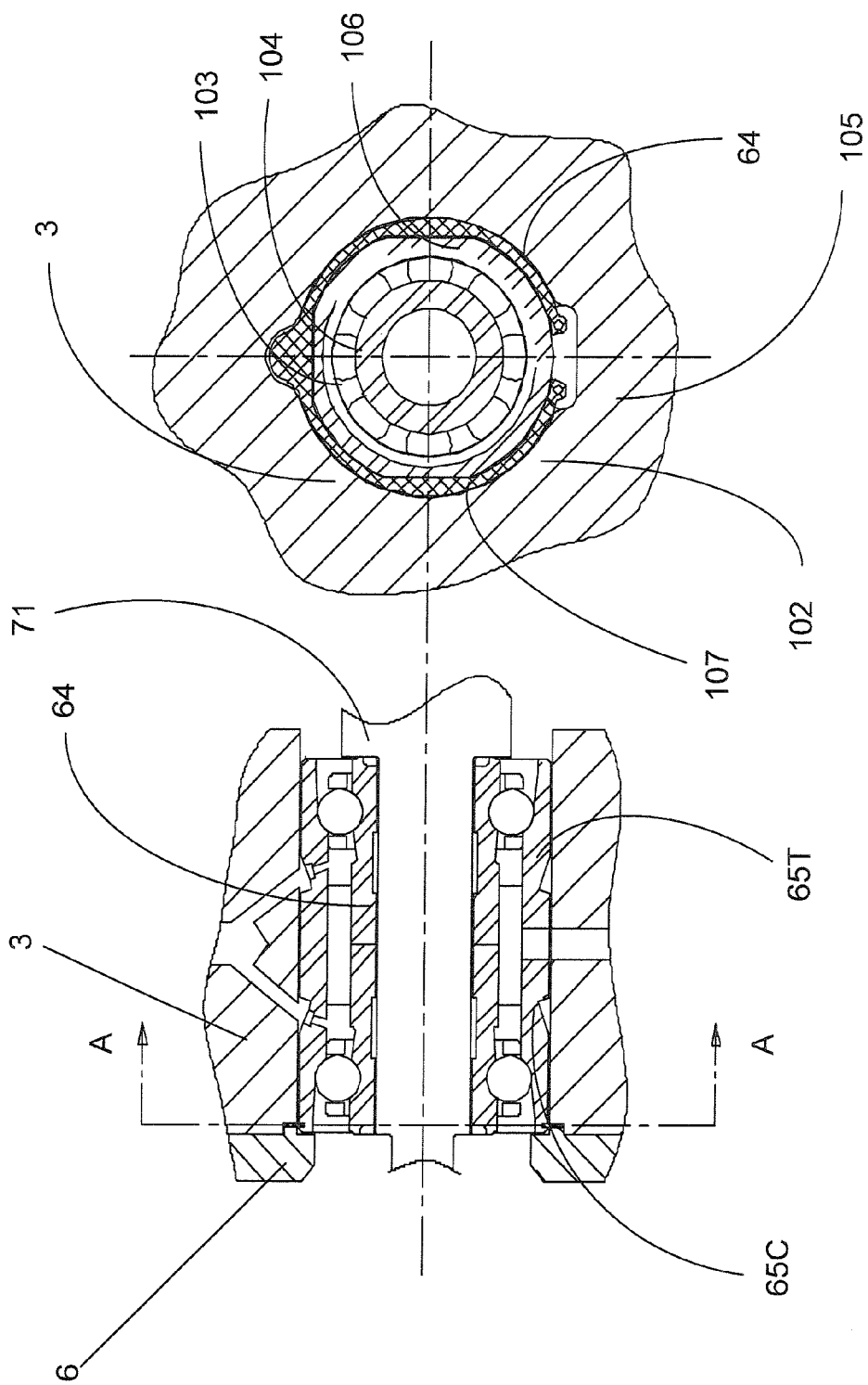
FIGS. 6A, 6B depict section views of the first embodiment of the invention.
Figure 7:
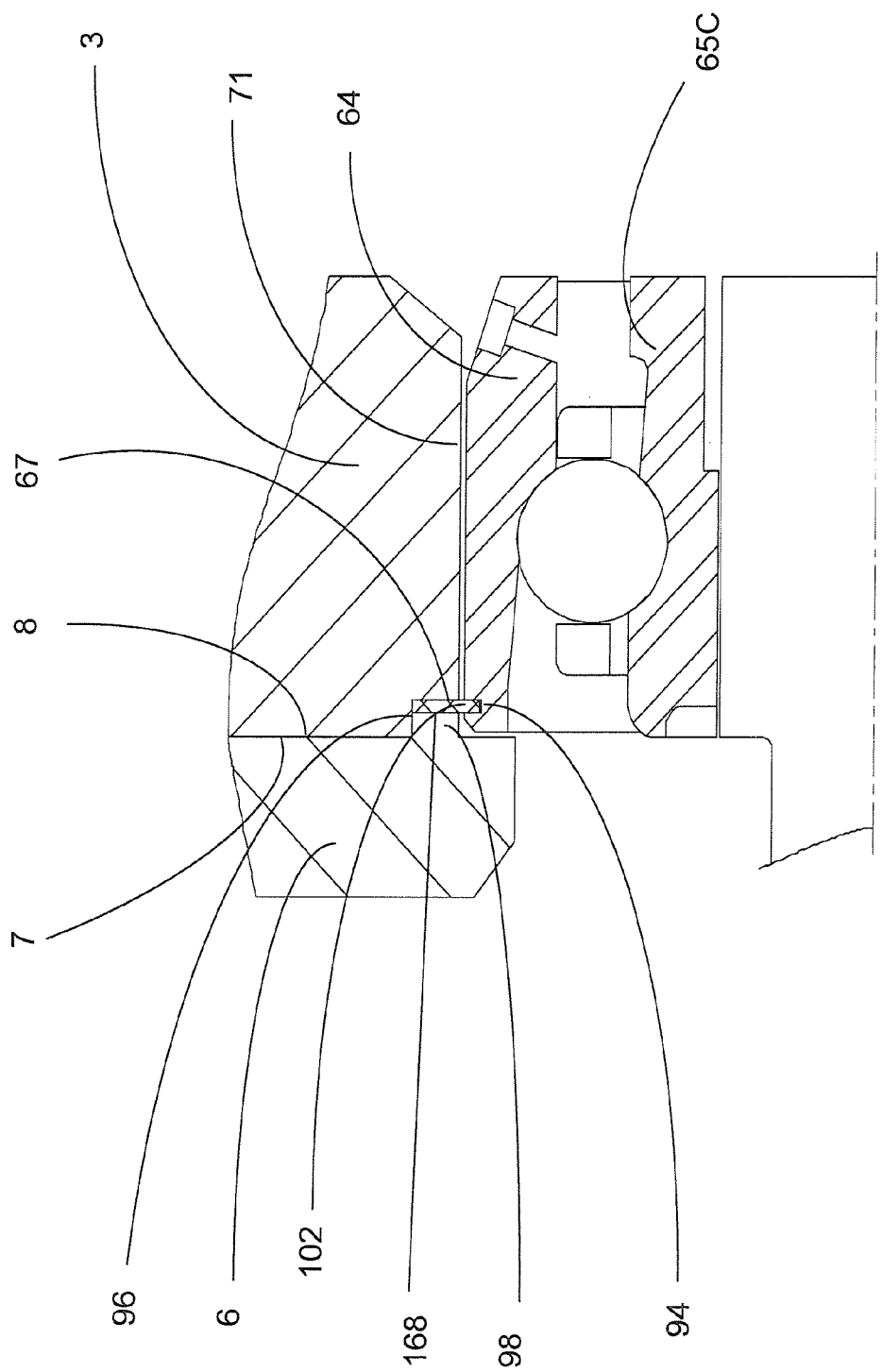
FIG. 7 depicts a further magnified view of FIG. 6A.

As depicted in FIGS. 5, 6A and B, and magnified for clarity in FIG. 7, the compressor-end face (8) of the bearing housing (3) has material moved, or removed from it to accept the axial thickness and/or shape (for example, an axial blind bore adapted to receiving an axial bullet or pin extending out from the compressor side cheek face to prevent rotation of the snap ring (102). The shape (96) of the material removed from the compressor-end face (8) of the bearing housing (3) is a reverse image, with clearance, of the dual-mode snap ring (102), including anti-rotation feature, with the dual-mode snap ring in the assembled-to-the REB cartridge state.

As in conventional snap rings, the dual-mode snap ring has a pair of eyelets (110) to allow the dual-mode snap ring to be expanded and contracted with typical snap ring pliers. In order for the tang of the snap ring pliers to fit in the eyelets, a relief zone (105) is provided. This zone is deeper than the relief (96) to allow the tang of the snap ring pliers to protrude through the snap ring, and the zone is sufficiently wide to allow the dual-mode snap ring to be expanded to allow removal, or installation, of the dual-mode snap ring on to the REB cartridge.

While this design relies on an eyelet to assemble and disassemble the dual-mode snap ring to the assembly, the snap ring could be a non-eyelet type snap ring as long as it features an anti-rotation devices to both the bearing housing and to the REB cartridge.

Figures 11A, 11B:
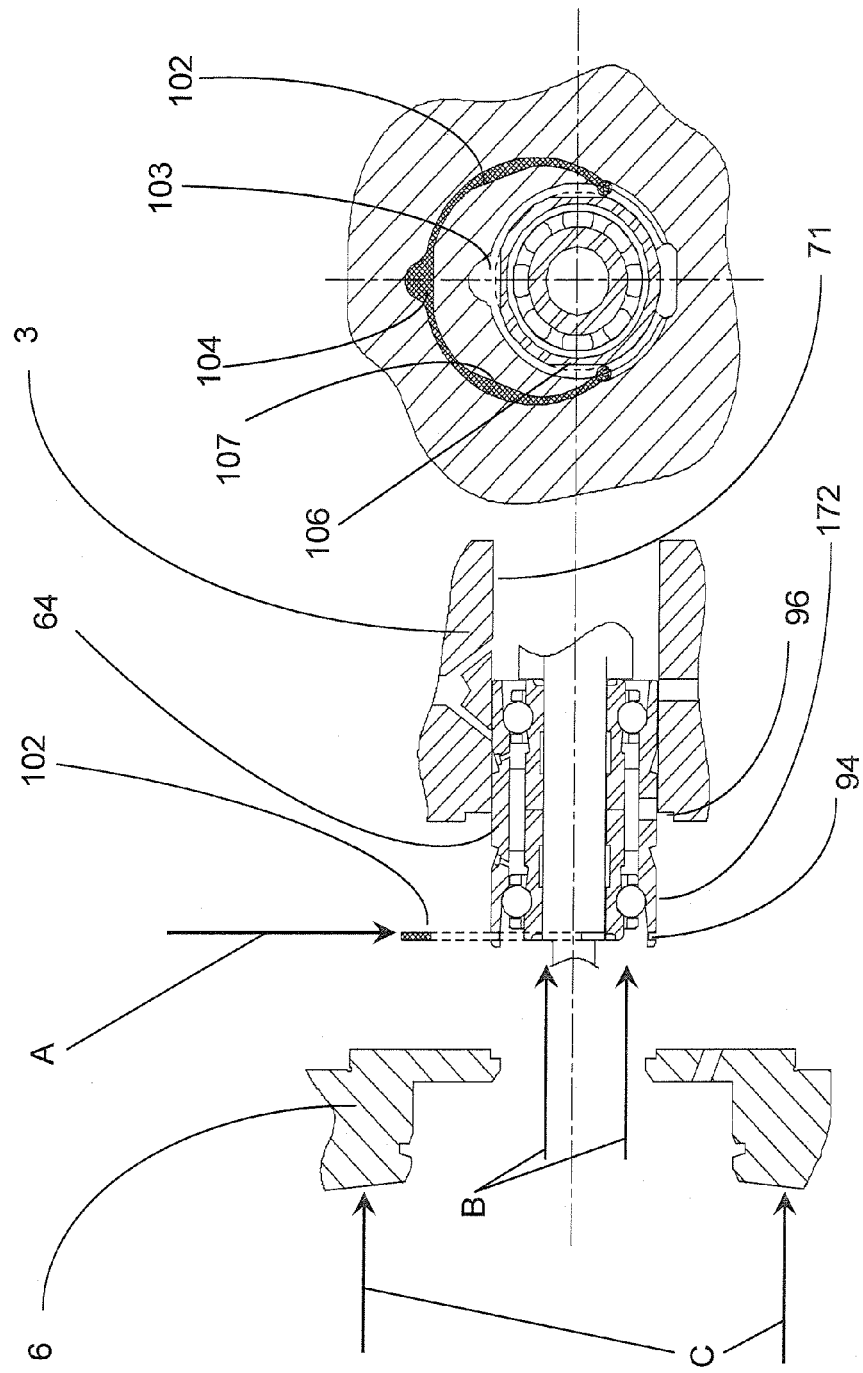
FIGS. 11A, 11B depict assembly order of the first embodiment of the invention.

To assemble the first embodiment of the invention, as seen in FIGS. 11A and B, the assembly must be performed in order. In stage "A", the dual-mode snap ring (102) is expanded to allow it to slide over the outside diameter of the REB cartridge (64) until it is aligned with the groove (94) in the REB cartridge. The dual-mode snap ring is then allowed to contract into the groove (94) in the REB cartridge such that the flats (107) on the dual-mode snap ring (102) align with the corresponding flats (106) in the REB cartridge. In stage "B", this partial assembly is then slid towards the turbine-side in the bore (71) in the bearing housing (3) and rotated until the tab (104) of the dual-mode snap ring aligns with the corresponding scallop (96) in the bearing housing, thus presenting the REB cartridge in the correct, unique, orientation for the oil inlet and oil drain to match the corresponding ports in the bearing housing. The thickness between the cheek surfaces (108 and 109) of the dual-mode snap ring is less than the depth of the scallop (96), so when assembled correctly, the surface (108) of the dual-mode snap ring is beneath the surface (8) of the bearing housing.

In the exemplary first embodiment of the invention, as depicted in FIGS. 5 to 7, a bearing housing closure (6) has a positive ledge or abutment (98) with a generally circular radial shape, albeit slightly smaller to allow assembly of the reverse image of the snap ring outer surface and shape (111), and a depth of the abutment dimensioned to fit into the assembly of the REB cartridge and snap ring previously introduced into the bearing housing, such that the dual-mode snap ring is axially captured by the turbine-side abutment surface (168) of the bearing housing closure, and the compressor-side surface (67) of the bearing housing. The bearing housing closure (6), in the exemplary embodiment of the invention, is bolted to the bearing housing; however, it can be mounted to the bearing housing by any of the common methods used to typically hold this assembly together, including vee-bands, bolts and nuts, or studs and nuts.

Thus in the exemplary first embodiment of the invention, the REB cartridge is captured by the assembly of the bearing housing, the bearing housing closure, and the dual-mode snap ring (102). In this manner, the turbocharger (axial) aerodynamic thrust loads are transmitted through the dual-mode snap ring to the bearing housing in both directions, or the bearing housing in one axial direction and the bearing housing closure plate in the other axial direction, thereby constraining the REB cartridge and thus controlling the axial position of the rotating assembly. Since the dual-mode snap ring (102) has an anti-rotation feature (104) which is constrained rotationally by the reverse imaged scallop (103) in the bearing housing, it can be seen that both axial and rotational constraint functions are delivered by a single, cost effective part: the dual-mode snap ring.

In the above discussed exemplary first embodiment of the invention, the shape of the projecting material was a radially slightly smaller reverse image of the shape of the removed material on the compressor-side of the snap ring in the bearing housing in order for the abutment or projecting material to axially constrain the snap ring in the direction of the compressor. The shape of the projecting material could be a circle segment, or it can be of such a shape that it does not cover the entire snap ring on the compressor-side of the snap ring. The shape of the projecting material must be sufficient to constrain the snap ring in the direction of the compressor. Alternatively, in at least the first embodiment, the bearing housing could have a bore, and the snap ring could have an axially extending bullet or pin.

In a first variation of the first embodiment of the invention, the depth of the recess (96) (formed by the depth of the recess surface (67) from the bearing housing surface (8)) in the compressor-side of the bearing housing, is equal to the sum of the thickness of the snap ring, (from the surface (109) to the surface (108)) plus the projection of the abutment (98), (from the surface (7) of the bearing housing closure to the surface (168) of the abutment projection) in the bearing housing closure. For the purpose of clarity the cavity for the snap ring thickness, as defined above, shall be known as "the depth of the snap ring axial cavity".

In the design of the REB retention system thermal expansion and contraction of the various parts must be taken into consideration. In the worst thermal/tolerance stack condition the snap ring thickness may be at most equal to the depth of the snap ring axial cavity and in the worst thermal/tolerance stack condition case, the snap ring may not be loose in the snap ring axial cavity.

Figure 9:
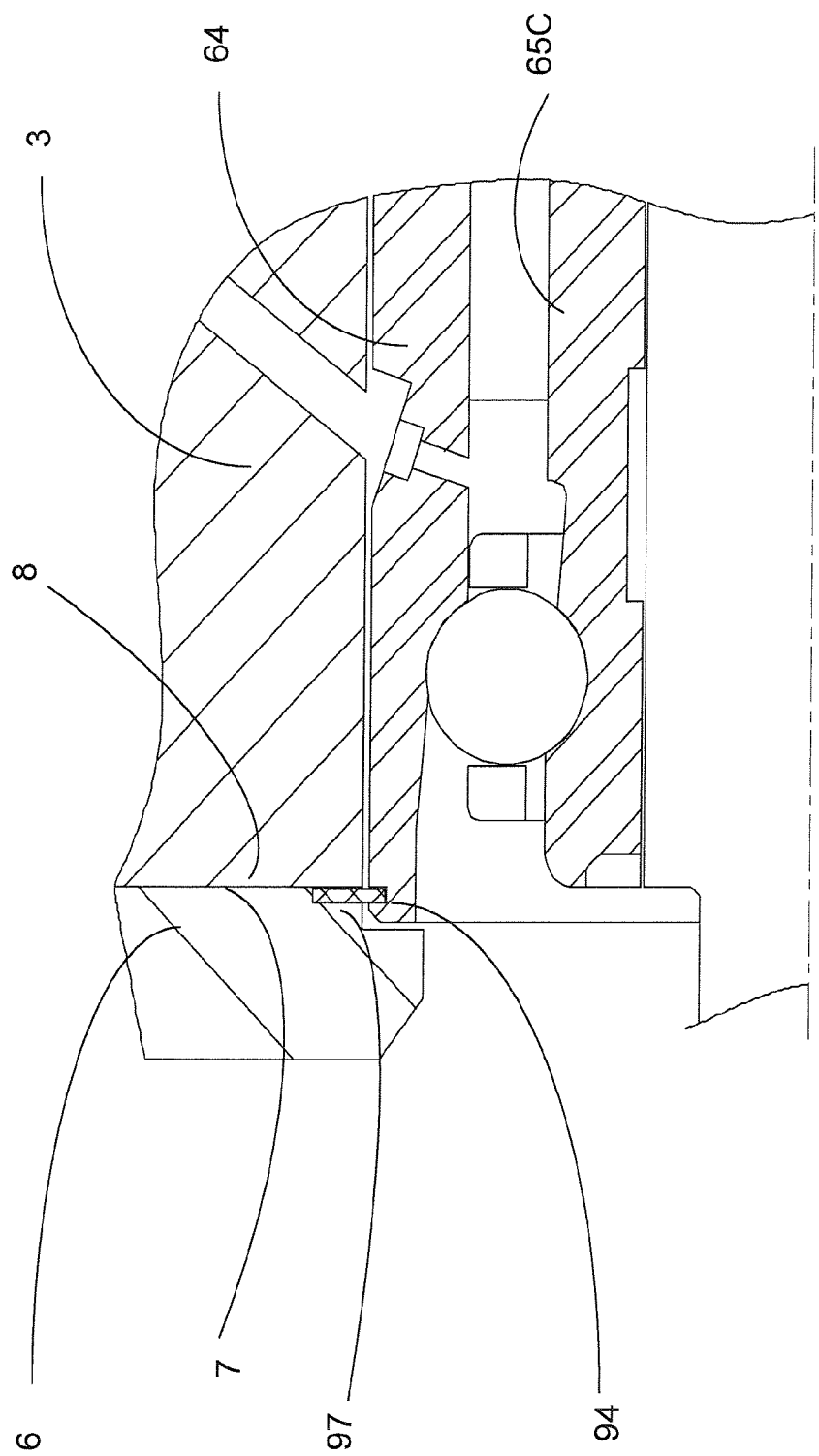
FIG. 9 depicts a magnified section of a first variation of the first embodiment of the invention.
Figures 10A, 10B:
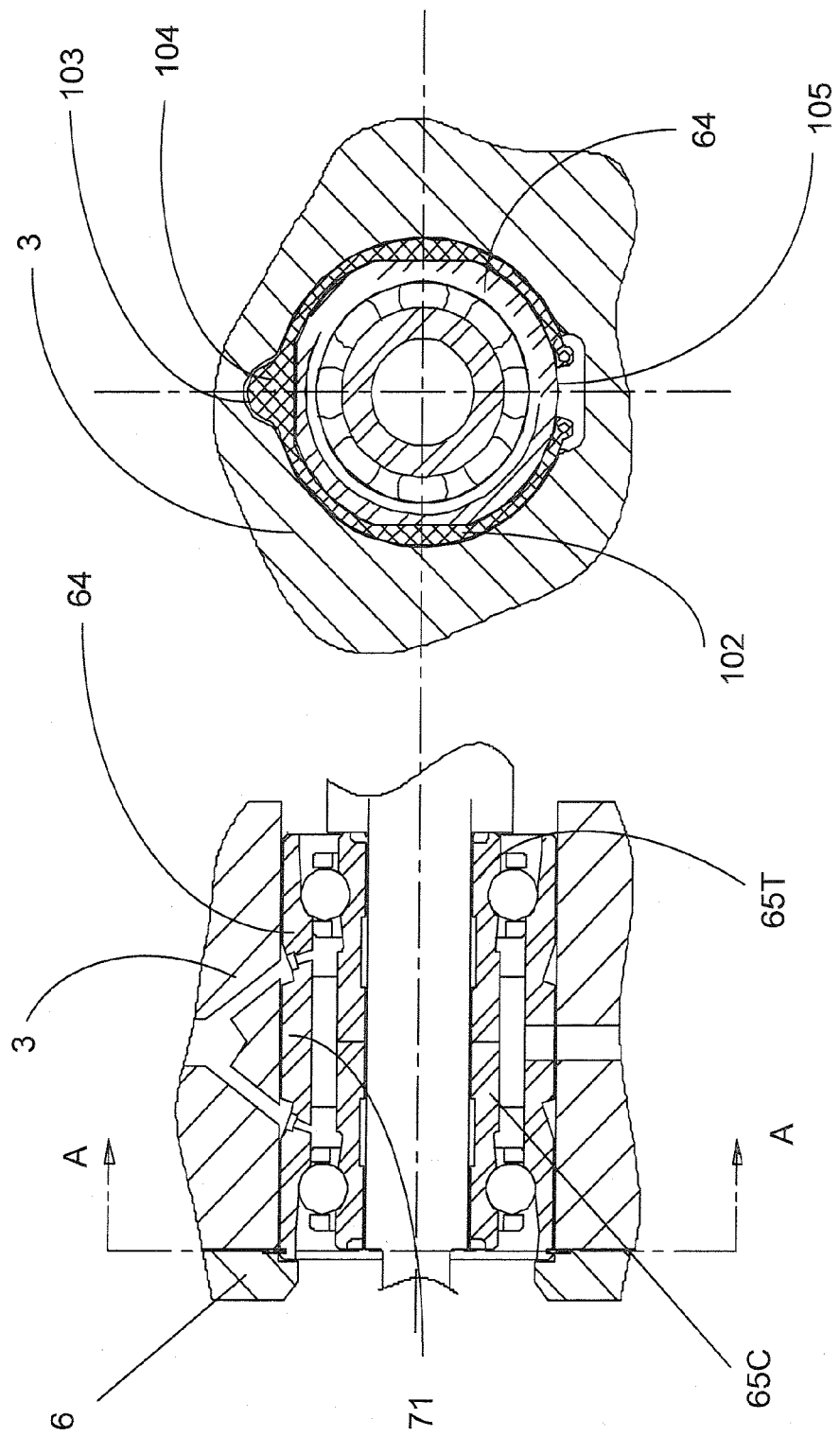
FIGS. 10A, 10B depict magnified sections of a second variation of the first embodiment of the invention.

In a second variation of the first embodiment of the invention, as depicted in FIGS. 9 and 10, the compressor-side face (8) of the bearing housing is flat (with no recess (96)) in the region of the dual-mode snap ring, and the recess (97) is in the turbine-side face (7) of the bearing housing closure (6).

In the first embodiment of the invention, as depicted in FIGS. 5,6,7,9,10,12 the anti-rotation tab (104) is a geometric feature which fits into the reverse image scallop (103) in the bearing housing (3). In a variation of the first embodiment of the invention, as depicted in FIGS. 12A and 12B, the anti-rotation feature (114) of the dual-mode snap ring (107) encompasses more of the outside surface (111) of the snap ring than the tab (104), and the anti-rotation feature in this variation of the first embodiment of the invention, fits into a reverse imaged scallop (113) in the bearing housing such that the angular orientation of the snap ring in the scallop in the bearing housing is unique. The fitting of the flat surfaces (107) on the inside surface of the dual-mode snap ring (102) to the corresponding flat surfaces (106) in the REB cartridge or, outer race (64), remain the same as those of the first embodiment of the invention.

Figure 8:
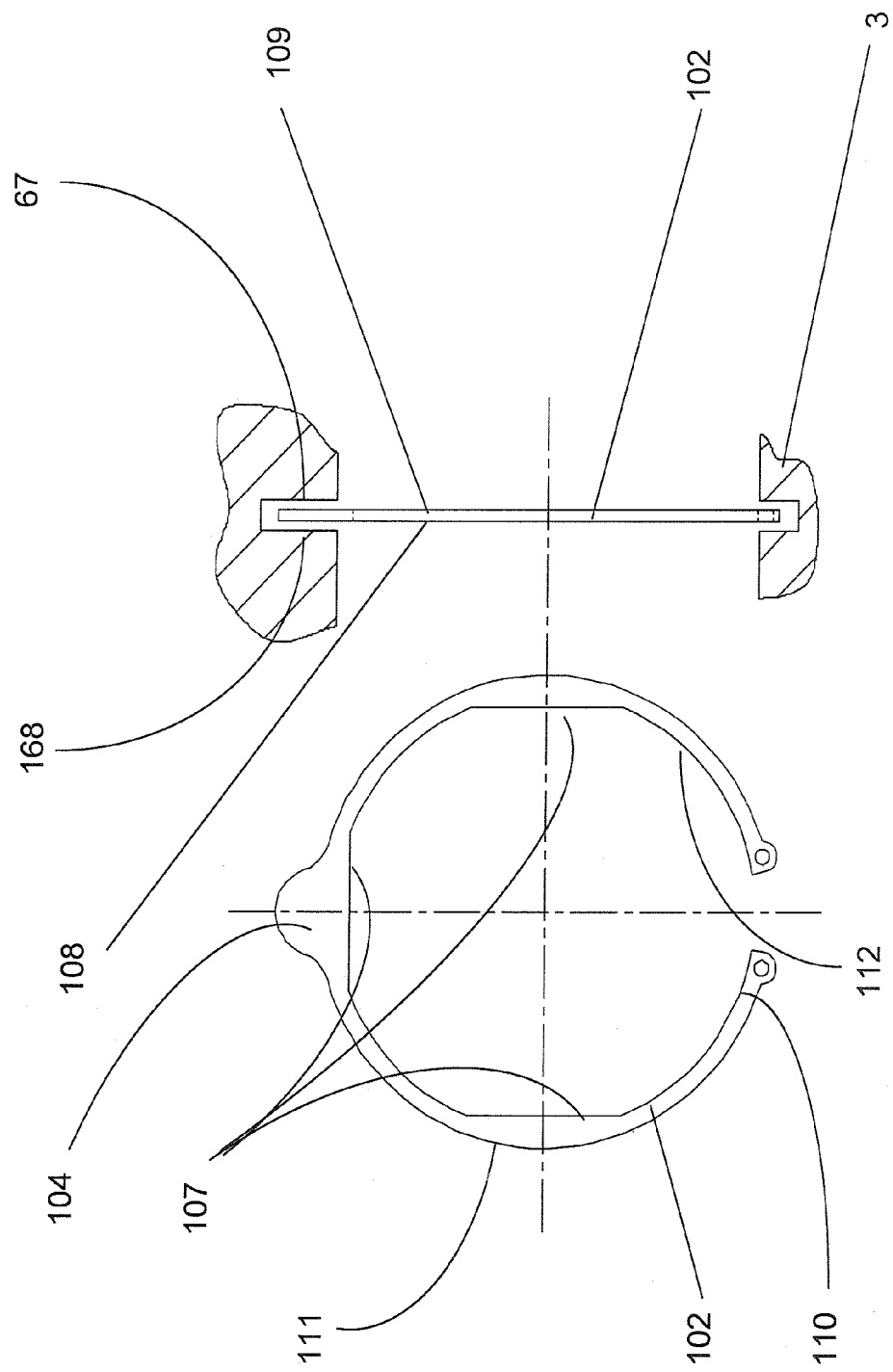
FIGS. 8A, 8B depict front elevation and end elevations of the invention.
Figures 13A, 13B:
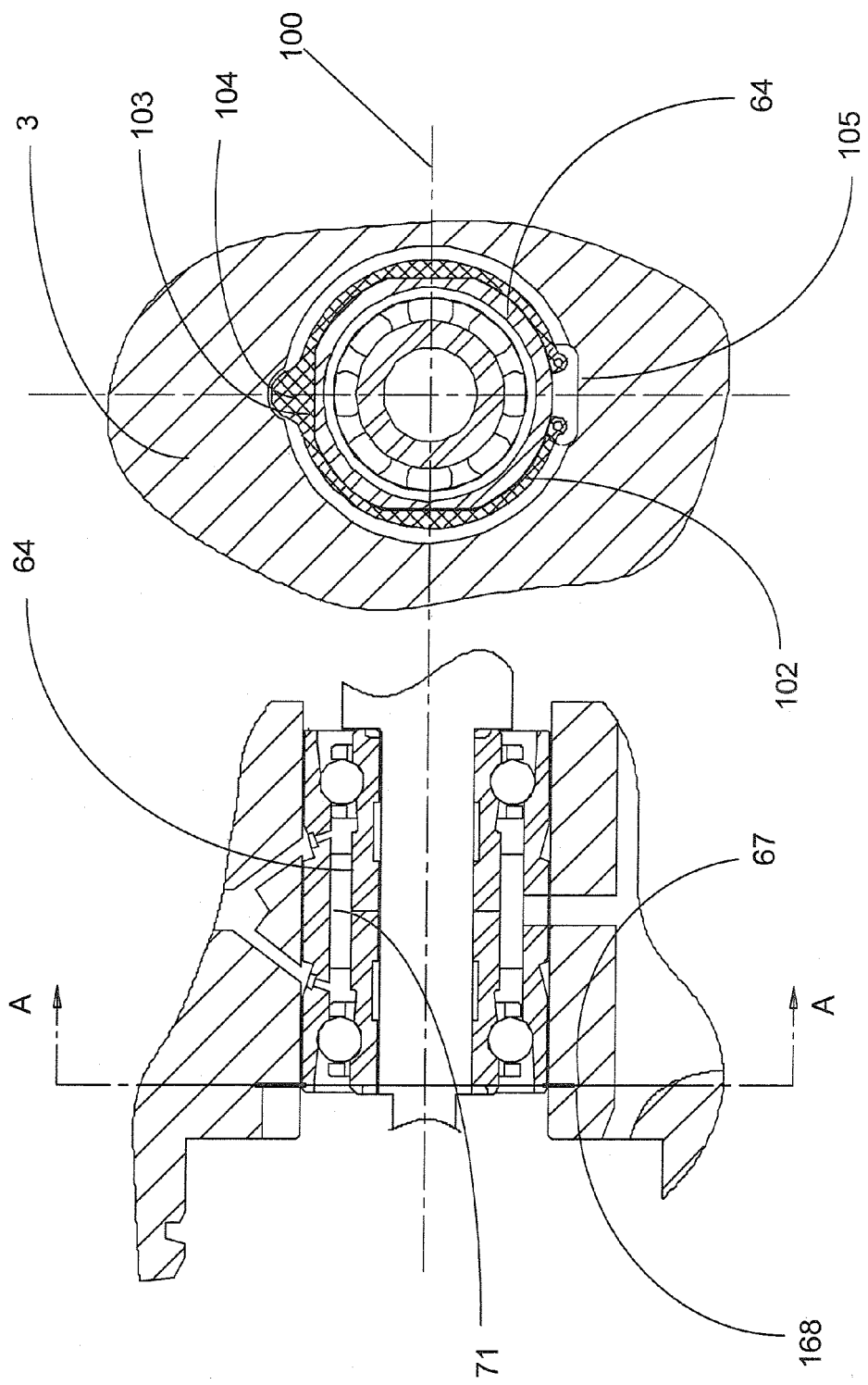
FIGS. 13A, 13B depict section views of a second embodiment of the invention.

In a second embodiment of the invention, a dual-mode snap ring (102) resides in a snap ring groove (95) in the bearing housing (3). As seen in FIGS. 8, 13, and 14, the snap ring groove has a turbine-housing side (67) and a compressor-side (168). There exists a snap ring groove (94) in the outer surface (172) of the outer race or cartridge (64).

In the first embodiment of the invention, the rotational constraint of the dual-mode snap ring employed a protruding male tab (104) which fit into a reverse-imaged recess (103) in a "lock and key" manner. The tab and recess were situated in either of the bearing housing (3) or the bearing housing closure (6). In the second embodiment of the invention, the constraint, both axially and rotationally, of the REB cartridge is provided by a dual-mode snap ring and the bearing housing only.

Since the snap ring groove is contained wholly within the bearing housing, the anti-rotation feature recess must be machined "blind" to intersect the cheek faces (67 and 168) of the snap ring groove. In FIG. 14, a hole with an outside diameter (83) sufficient to enable the anti-rotation tab (104) of the dual-mode snap ring to drop into the remaining section of the hole in the zone where the hole with a centerline (82), and the snap ring groove (95) intersect. The radially outside portion of the outside diameter (83) of the hole can be seen, un-shaded, in FIG. 14. The radially inside portion of the hole is machined away by the fabrication of the bearing housing bore (71).

In the second embodiment of the invention, the assembly order must change from that of the first embodiment of the invention. In the second embodiment of the invention, the dual-mode snap ring (102) is collapsed for insertion into the groove (95) surrounding the bearing housing bore (71) in the bearing housing. The snap ring can only be inserted with the male anti-rotating feature (104) fitted into the female scallop formed by the intersection of the hole (83) and the snap ring groove (95) in the bearing housing. The snap ring is then expanded within the groove (94) in the bearing housing so that the REB cartridge (64) can be slid through the expanded snap ring. The snap ring is allowed to return to its "at rest" shape with the flat sections (107) on the inside surface (112) of the snap ring locating the flat surfaces (106) at the base of the groove (94) in the REB cartridge. The REB cartridge (64) may have to be rotated in order for the flats in the inner surface of the snap ring to align with the flats at the base of the groove (94) in the REB cartridge, or outer race. Thus the REB cartridge has a unique angular orientation to the snap ring, and the snap ring has a unique angular orientation to the bearing housing.

As in the first embodiment of the invention, the turbine-end abutment (73) seen in FIG. 2 is no longer required, allowing the machining of the bearing housing bore (71) to terminate in a break out into the oil flinger cavity (170).

So it can be seen that in either embodiment of the invention, a singular, cost-effective, dual-mode snap ring constrains both the axial position and the rotation of the REB cartridge with respect to the bearing housing.

Now that the invention has been described,

What is claimed is:

1. A turbocharger including:
   a shaft having a compressor end and a turbine end;
   a bearing housing (3) including a bearing housing bore and having a compressor side and a turbine side;
   a rolling element bearing (REB) cartridge supported in said bearing housing bore, the REB cartridge comprising at least one inner race (65, 65C, 65T), at least one outer race (64), and a series of rolling elements, each rolling element in contact with an inner race and an outer race, wherein the REB cartridge has a center axis, a compressor end, and a turbine end, and wherein a circumferential groove (94) is formed in the outer circumference of the REB cartridge (64), perpendicular to the center axis, and near the compressor end or turbine end of the REB cartridge;
   a bearing housing closure plate (6) mounted to the compressor side of the bearing housing; and
   a snap ring,
   wherein the REB cartridge is located in the bearing housing bore,
   wherein the shaft is rotationally supported by the REB cartridge,
   wherein the snap ring is seated partially in the groove (94) in the REB cartridge and is axially constrained between the bearing housing (3) and the bearing housing closure plate (6), thereby axially locating the REB cartridge, and
   wherein the snap ring has at least one first anti-rotation feature in engagement with a cooperating anti-rotation feature in the groove (94) and at least one second anti-rotation feature in engagement with a cooperating anti-rotation feature in at least one of the bearing housing (3) and the bearing housing closure plate (6), such that the snap ring prevents rotation of the outer race.

2. The turbocharger of claim 1, wherein the radially inner surface of the snap ring is generally circular, and wherein the first anti-rotation feature is a straight or curved deviation from said generally circular radially inner surface.

3. The turbocharger of claim 1, wherein the outer diameter of the outer race corresponds to the outer diameter of the REB cartridge.

4. The turbocharger of claim 1, wherein the REB cartridge comprises a sleeve containing at least two REB assemblies, each REB assembly comprising at least one inner race (65, 65C, 65T), at least one outer race (64), and a series of rolling elements, each rolling element in contact with an inner race and an outer race, said sleeve defining the outer diameter of the REB cartridge.

5. The turbocharger of claim 1, wherein the radially outer surface of the snap ring is generally circular, and wherein the second anti-rotation feature is a straight, convex or concave deviation from said generally circular radially outer surface.

6. The turbocharger of claim 5, wherein the second anti-rotation feature comprises at least one convex projection from the generally circular radially outer surface.

7. The turbocharger of claim 5, wherein the second anti-rotation feature comprises at least one concave recess from the generally circular radially outer surface.

8. The turbocharger of claim 1, wherein the circumferential groove (94) formed in the outer circumference of the REB cartridge is near the compressor end of the REB cartridge.

9. The turbocharger of claim 1, wherein the snap ring is generally planar, and wherein at least one of the first and second anti-rotation features is an axial projection from the generally planar surface of the snap ring.

10. The turbocharger of claim 1, wherein the bearing housing bore is free of any turbine-end axial abutment (73).

11. A turbocharger including:
    a shaft having a compressor end and a turbine end;
    a bearing housing (3) including a bearing housing bore;
    a rolling element bearing (REB) cartridge supported in said bearing housing bore, the REB cartridge comprising at least one inner race (65, 65C, 65T), at least one outer race (64), and a series of rolling elements, each rolling element in contact with an inner race and an outer race, wherein the REB has a center axis, a compressor end, and a turbine end, and wherein a circumferential groove (94) is formed in the outer circumference of the REB cartridge (64), perpendicular to the center axis, and near the compressor end or turbine end of the REB cartridge; and
    a snap ring,
    wherein the REB cartridge is located in the bearing housing bore,
    wherein the shaft is rotationally supported by the REB cartridge,
    wherein the snap ring is seated partially in the REB cartridge groove (94) and is axially constrained by the bearing housing (3), thereby axially locating the REB cartridge, and
    wherein the snap ring has at least one first anti-rotation feature in engagement with a cooperating anti-rotation feature in the REB cartridge groove (94) and at least one second anti-rotation feature in engagement with a cooperating anti-rotation feature in the bearing housing (3), such that the snap ring prevents rotation of the outer race.

* * * * *